United States Patent
Mohanty et al.

(10) Patent No.: US 10,574,519 B2
(45) Date of Patent: Feb. 25, 2020

(54) DETECTION AND CONFIGURATION OF A LOGICAL CHANNEL

(71) Applicant: Cisco Technology, Inc., San Jose, CA (US)

(72) Inventors: Subrat Mohanty, Los Gatos, CA (US); Shyamsundar N. Maniyar, San Jose, CA (US); Mark Montañez, Gilroy, CA (US); Ravindra Narayan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 196 days.

(21) Appl. No.: 15/708,175

(22) Filed: Sep. 19, 2017

(65) Prior Publication Data

US 2019/0089590 A1 Mar. 21, 2019

(51) Int. Cl.
| | |
|---|---|
| *H04L 12/24* | (2006.01) |
| *H04L 12/709* | (2013.01) |
| *H04L 12/803* | (2013.01) |
| *H04L 12/891* | (2013.01) |

(52) U.S. Cl.
CPC .......... *H04L 41/0809* (2013.01); *H04L 41/12* (2013.01); *H04L 41/0893* (2013.01); *H04L 45/245* (2013.01); *H04L 47/125* (2013.01); *H04L 47/41* (2013.01)

(58) Field of Classification Search
CPC ..... H04L 45/245; H04L 45/28; H04L 45/586; H04L 41/0893; H04L 41/0663; H04L 41/0809; H04L 41/12; H04L 47/125; H04L 47/41; G06F 11/2007
See application file for complete search history.

(56) References Cited

U.S. PATENT DOCUMENTS

| | | | | |
|---|---|---|---|---|
| 2005/0047334 | A1* | 3/2005 | Paul | H04L 12/5601 370/229 |
| 2011/0310729 | A1* | 12/2011 | Raman | G06F 11/2007 370/225 |
| 2012/0233492 | A1* | 9/2012 | Finn | H04L 45/586 714/4.1 |
| 2013/0229912 | A1* | 9/2013 | Yu | H04L 41/0663 370/228 |
| 2015/0103673 | A1* | 4/2015 | Shimada | H04L 41/0893 370/241.1 |
| 2017/0063672 | A1* | 3/2017 | Chhabra | H04L 41/0663 |
| 2018/0331977 | A1* | 11/2018 | Krishnasamy | H04L 45/245 |
| 2018/0351855 | A1* | 12/2018 | Sood | H04L 45/28 |

* cited by examiner

*Primary Examiner* — Jungwon Chang
(74) *Attorney, Agent, or Firm* — Merchant & Gould P.C.

(57) ABSTRACT

Detection and configuration of a logical channel may be provided. First, data traffic received on a plurality of ports of a first network device may be analyzed by a computing device. Next, based upon analyzing the data traffic received on the plurality of ports, the computing device may determine that the plurality of ports comprise a logical channel from the perspective of a second network device. The plurality of ports may then be configured as the logical channel on the first network device based upon determining that the plurality of ports comprise the logical channel from the perspective of the second network device.

20 Claims, 3 Drawing Sheets

DETECTION AND CONFIGURATION OF A LOGICAL CHANNEL

TECHNICAL FIELD

The present disclosure relates generally to network provisioning.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet. Client address based forwarding of dynamic host configuration protocol response packets.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
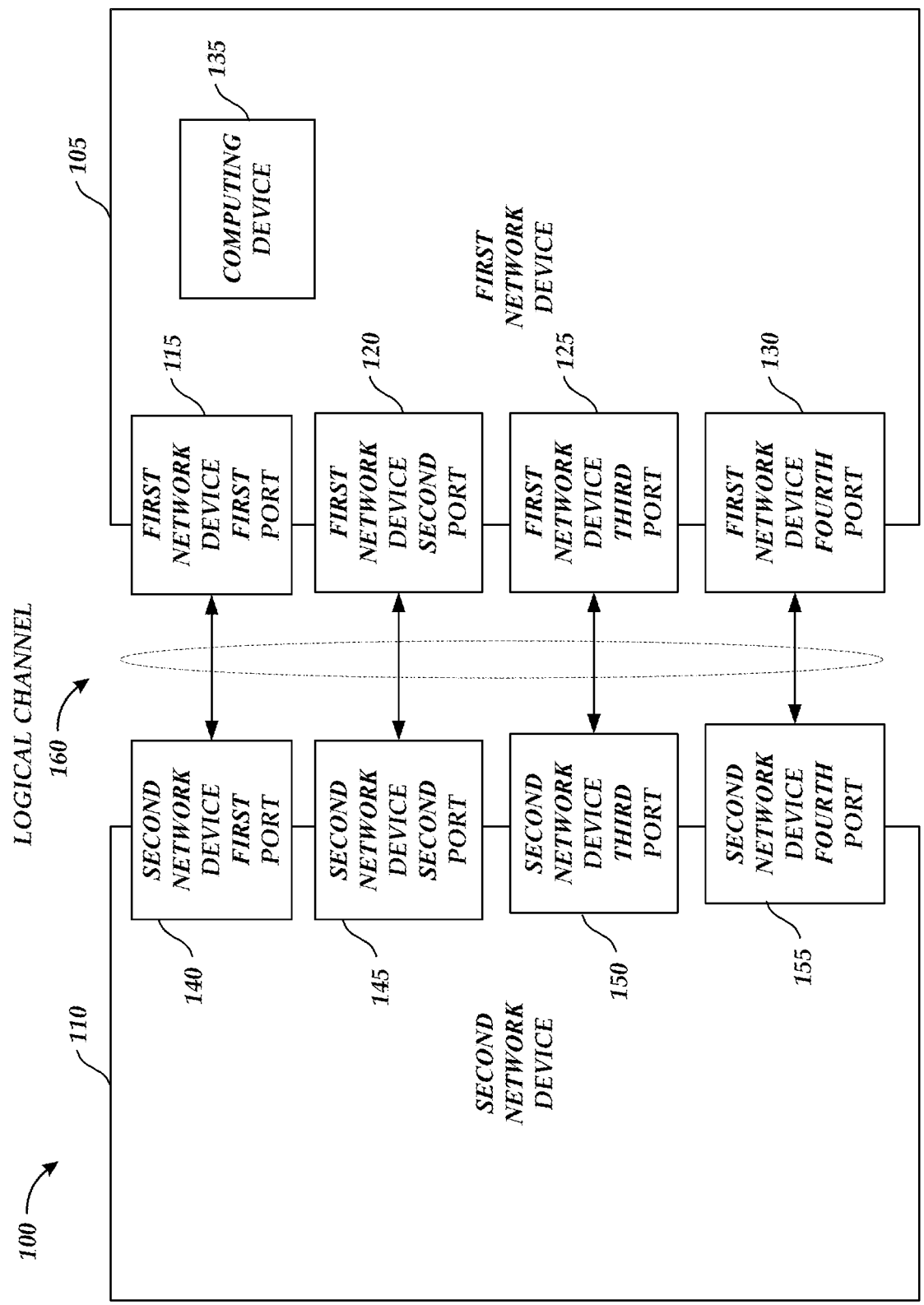
FIG. 1 shows a system for providing detection and configuration of a logical channel.

Detection and configuration of a logical channel may be provided. First, data traffic received on a plurality of ports of a first network device may be analyzed by a computing device. Next, based upon analyzing the data traffic received on the plurality of ports, the computing device may determine that the plurality of ports comprise a logical channel from the perspective of a second network device. The plurality of ports may then be configured as the logical channel on the first network device based upon determining that the plurality of ports comprise the logical channel from the perspective of the second network device.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Deploying a new network device (e.g., an access switch) in a network may involve a network bootstrap mechanism, for example, Dynamic Host Configuration Protocol (DHCP). The new network device being deployed may assume that layer-2 connectivity may be available without any pre-configuration. However, when deploying the new network device using network bootstrap, an encountered problem may comprise the existence of aggregated ports comprising a logical channel (e.g., using Link Aggregation Control Protocol (LACP)) on an existing and already provisioned uplink distribution switch to which the new network device is connected. The new network device being deployed may need connectivity through the already provisioned uplink distribution switch over a layer-2 logical channel using LACP for example. Because no startup configuration may exist on the new network device, the new network device may not bring up the logical channel with the existing uplink distribution switch. This may result in the new network device keeping a plurality of ports on the new network device corresponding to the logical channel in a suspended state. Consequently, layer-2 protocols (e.g., Cisco Discovery Protocol (CDP) and Spanning Tree Protocol (STP)) may not function and the new network device may not have any connectivity to the network. Moreover, Day 0 bootstrap mechanisms such as auto install and plug and play may not function in this situation.

Embodiments of the disclosure may include enhancements to the operating system of the new network device for day 0 bootstrap scenarios where the new network device may be booted up without any startup configuration. These enhancements may allow the operating system to discover the presence of a logical channel with the existing uplink distribution switch by, for example, snooping on LACP protocol packets being received on the new network device. With conventional processes, these LACP packets may be dropped due to the lack of logical channel configuration.

Consistent with embodiments of the disclosure, enhancements may be added to the operating system of the new network device that may glean sufficient information from the LACP packets before they are dropped. This information may be used by the enhanced operating system to automatically configure the expected logical channel and LACP parameters on the new network device without any user input. This may cause the logical channel to come up automatically during day 0 scenarios. Furthermore, once the logical channel is up, layer-2 connectivity may be operational and the new network device may further attain layer-3 connectivity, for example, by established processes such as DHCP. Consequently, embodiments of the disclosure may provide a day 0 bootstrap process (e.g., including network plug and play over the logical channel) without any user intervention.

Accordingly, embodiments of the disclosure may automatically detect the presence of logical channels and then automatically configure the new network device with an appropriate logical channel to provide network connectivity to the new network device for a day 0 bootstrap process. This may allow users to deploy and utilize day 0 bootstrap processes in the presence of logical channels without manual intervention or explicit configuration of the logical channel.

In addition, when there are multiple connections between two switching entities (e.g., the new network device and the existing uplink distribution switch) in a bridge domain, often one of them may be STP blocked to avoid loop. So, the bandwidth of the blocked connection may be unused or wasted. Consistent with embodiments of the disclosure, the loop may be detected in STP. Additional logic may be placed in the operating system to check if blocked ports are connected to the same peer (e.g., network device). A bridge ID may be used to identify this. STP may block the port, but may signal the network device that it has a redundant link to a peer. The network device may validate and bundle these ports and enable STP on the logical channel and disable STP on the individual ports. Moreover, an additional software block may be introduced to scan through each local port and its peer device after CDP detects the peer ports. If there are multiple ports that are connected to the same peer device, a module may check the configuration for each port. If the multiple ports are switch ports (i.e., layer-2 ports), the module may bundle them to a single logical port channel and enables a trunk mode after considering other physical port property and capability. Embodiments of the disclosure may provide detection and configuration of a logical channel in either of these situations.

FIG. 1 shows a system 100 for providing detection and configuration of a logical channel consistent with embodiments of the disclosure. As shown in FIG. 1, system 100 may comprise a first network device 105 and a second network device 110. First network device 105 may comprise a plurality of ports. The plurality of ports of first network device 105 may comprise a first network device first port 115, a first network device second port 120, a first network device third port 125, and a first network device fourth port 130. The plurality of ports on first network device 105 may comprise any number of ports and is not limited to four. First network device 105 may comprise, but is not limited to, a switch or a router, for example.

First network device 105 may further comprise a computing device 135. While FIG. 1 shows computing device 135 being deployed in first network device 105, computing device 135 may be deployed anywhere (e.g., in the Cloud) and is not limited to being deployed in first network device 105.

Second network device 110 may comprise a plurality of ports. The plurality of ports of second network device 110 may comprise a second network device first port 140, a second network device second port 145, a second network device third port 150, and a second network device fourth port 155. The plurality of ports on second network device 110 may comprise any number of ports and is not limited to four. Second network device 110 may comprise, but is not limited to, a switch or a router, for example.

First network device 105 may comprise, for example, a stack switching unit (i.e., a stack unit) comprising more than one network device configured virtually as one device in a stack. Similarly, second network device 110 may comprise a stack switching unit (i.e., a stack unit) comprising more than one network device configured virtually as one device in a stack.

Furthermore, consistent with embodiments of the disclosure, first network device 105 and second network device 110 may be configured within a same stack switching unit. Embodiments of the disclosure described herein may be used when first network device 105 and second network device 110 may be connected and provisioned within the same stack.

The plurality of ports of first network device 105 may be physically and respectively connected with the plurality of ports of second network device 110. These connections may comprise a logical channel 160. For example, logical channel 160 may comprise a combination (i.e., aggregation) of multiple network connections in parallel in order to: i) increase throughput beyond what a single connection could sustain; and ii) provide redundancy in case one of the connections fails.

Logical channel 160 may comprise a Link Aggregation Group (LAG) that may combine (e.g., aggregate) a number of physical ports together to make a single high-bandwidth data path, so as to implement traffic load sharing among member ports in the group and to enhance connection reliability. Logical channel 160 may utilize, but is not limited to, Link Aggregation Control Protocol (LACP) by sending LACP packets between second network device 110 and first network device 105. Second network device 110 and first network device 105 may comprise other connected ports that may not be within logical channel 160 or may include other logical channels beside logical channel 160.

Figure 2:
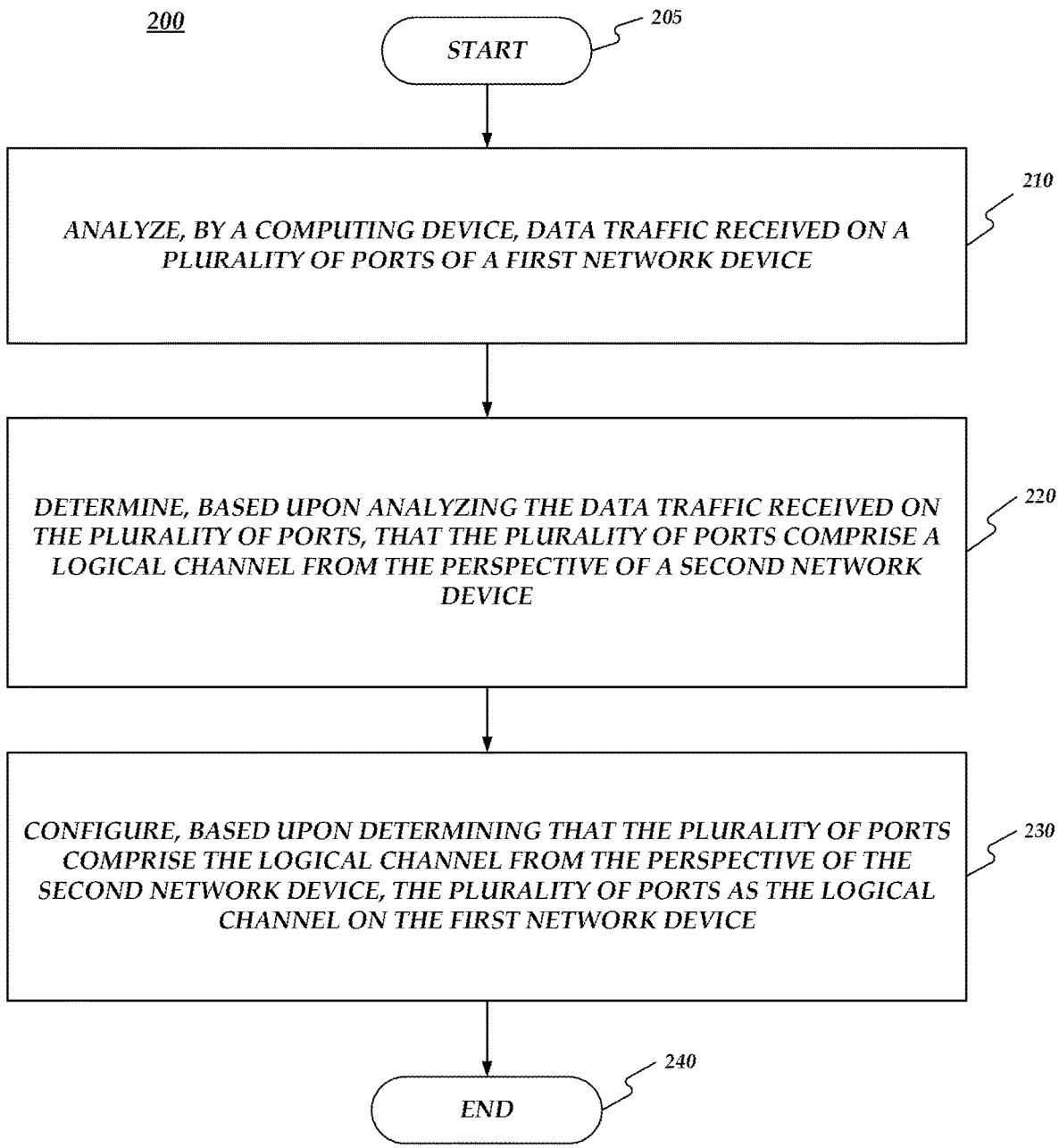
FIG. 2 is a flow chart of a method for providing detection and configuration of a logical channel.

FIG. 2 is a flow chart setting forth the general stages involved in a method 200 consistent with an embodiment of the disclosure for providing detection and configuration of a logical channel. Method 200 may be implemented using a computing device 135 as described in more detail below with respect to FIG. 3. Ways to implement the stages of method 200 will be described in greater detail below.

Method 200 may begin at starting block 205 and proceed to stage 210 where computing device 135 may analyze data traffic received on the plurality of ports of first network device 135. For example, second network device 110 may comprise an existing uplink distribution switch in network 100. From the perspective of second network device 110, second network device first port 140, second network device second port 145, second network device third port 150, and second network device fourth port 155 may have been previously aggregated into logical channel 160. However, first network device 105, being newly connected to second network device 110, may not yet be aware that second network device first port 140, second network device second port 145, second network device third port 150, and second network device fourth port 155 have been previously aggregated into logical channel 160 by second network device 110. In order to determine if logical channel 160 exits, computing device 135 may analyze the data traffic received on the plurality of ports of first network device 135, for example, by snooping on LACP protocol packets being received on first network device 105.

From stage 210, where computing device 135 analyzes the data traffic received on the plurality of ports of first network device 135, method 200 may advance to stage 220 where computing device 135 may determine, based upon analyzing the data traffic received on the plurality of ports, that the plurality of ports comprise logical channel 160 from the perspective of second network device 110. For example, data traffic received on the plurality of ports of first network device 105 may indicate that second network device has aggregated second network device first port 140, second network device second port 145, second network device third port 150, and second network device fourth port 155 into logical channel 160. Furthermore, computing device 135 may know that first network device first port 115, first network device second port 120, first network device third port 125, and first network device fourth port 130 are respectively and correspondingly connected to second network device has aggregated second network device first port 140, second network device second port 145, second network device third port 150, and second network device fourth port 155. Accordingly, based upon this analysis, computing device 135 may determine that the plurality of ports on first network device 105 (i.e., first network device first port 115, first network device second port 120, first network device third port 125, and first network device fourth port 130) may comprise logical channel 160 from the perspective of second network device 110.

Once computing device 135 determines that the plurality of ports on first network device 105 comprise logical channel 160 from the perspective of second network device 110 in stage 220, method 200 may continue to stage 230 where computing device 135 may configure, based upon determining that the plurality of ports on first network device 105 comprise logical channel 160, the plurality of ports as logical channel 160 on first network device 105. For example, computing device 135 may discover the presence of logical channel 160 with second network device 110 (e.g., an existing uplink distribution switch) by snooping on LACP protocol packets being received on first network device 105. Accordingly, computing device 135 may automatically detect the presence of logical channel 160 and then automatically configure first network device 105 with a corresponding and appropriate logical channel (i.e., logical channel 160) to provide network connectivity to first network device 105. This may allow users to seamlessly deploy and utilize day 0 bootstrap processes in the presence of logical channels without manual intervention or explicit configuration of logical channel 160. Once computing device 135 configures the plurality of ports as logical channel 160 on first network device 105 in stage 230, method 200 may then end at stage 240. Consistent with embodiments of the disclosure, the process of method 200 may be performed in second network device 110 as well to comprise the logical channel from the perspective of first network device 105 and configured at second network device 110 to form, for example, a bidirectional fat logical channel.

Figure 3:
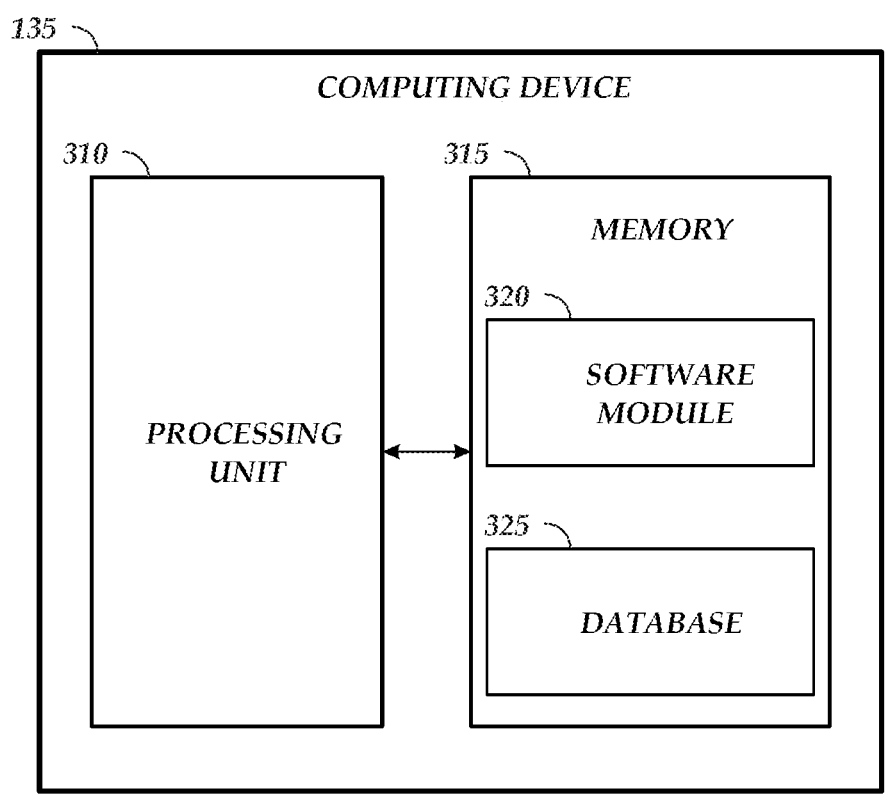
FIG. 3 shows a computing device.

FIG. 3 shows a computing device 135. As shown in FIG. 3, computing device 135 may include a processing unit 310 and a memory unit 315. Memory unit 315 may include a software module 320 and a database 325. While executing on processing unit 310, software module 320 may perform processes for providing detection and configuration of a logical channel, including for example, any one or more of the stages from method 200 described above with respect to FIG. 2. While FIG. 1 shows computing device 135 being deployed in first network device 105, computing device 135 may be deployed anywhere (e.g., in the Cloud) and is not limited to being deployed in first network device 105.

Computing device 135 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, or other similar microcomputer-based device. Computing device 135 may comprise any computer operating environment, such as hand-held devices, multiprocessor systems, microprocessor-based or programmable sender electronic devices, minicomputers, mainframe computers, and the like. Computing device 135 may also be practiced in distributed computing environments where tasks are performed by remote processing devices. The aforementioned systems and devices are examples and computing device 135 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining, based upon analyzing data traffic received on a first plurality of ports of a first network device, that a second plurality of ports comprise a logical channel from the perspective of a second network device, wherein determining that the second plurality of ports comprise a logical channel from the perspective of the second network device comprises:
   receiving the data traffic on the first plurality of ports of the first network device from the second network device, wherein receiving the data traffic on the first plurality of ports of the first network device comprises receiving the data traffic on the first plurality of ports of the first network device in response to the first network device getting connected to the second network device and prior to the first network device being configured with the second network device,
   analyzing the received data traffic prior to dropping the data traffic, wherein the first network device is operative to drop the data traffic prior to being configured with the second network device, and
   determining, based upon analyzing the data traffic, that the second plurality of ports comprise the logical channel; and
   configuring, based upon determining that the second plurality of ports comprise the logical channel from the perspective of the second network device, the first plurality of ports of the first network device as the logical channel on the first network device.

2. The method of claim 1, further comprising physically connecting the first plurality of ports of the first network device with the second plurality of ports of the second network device.

3. The method of claim 1, wherein analyzing the data traffic received on the first plurality of ports of the first network device comprises analyzing the data traffic received on the first plurality of ports of the first network device from an upstream network device comprising the second network device.

4. The method of claim 1, wherein analyzing the data traffic received on the first plurality of ports of the first network device comprises snooping on Link Aggregation Control Protocol (LACP) protocol packets received on the first plurality of ports of the first network device.

5. The method of claim 1, wherein determining that the second plurality of ports comprise the logical channel comprises determining that the second plurality of ports comprise the logical channel wherein the logical channel uses Link Aggregation Control Protocol (LACP).

6. The method of claim 1, wherein determining that the second plurality of ports comprise the logical channel from the perspective of the second network device comprises determining that the second plurality of ports comprise the logical channel from the perspective of the second network device wherein the second network device comprises an existing distribution switch in a network.

7. The method of claim 1, wherein configuring the first plurality of ports as the logical channel on the first network device comprises configuring the first plurality of ports as the logical channel on the first network device wherein the first network device comprises an un-configured access switch being added to a network.

8. An apparatus comprising:
   a memory storage; and
   a processing unit coupled to the memory storage, wherein the processing unit is operative to:
   determine, based upon analyzing data traffic received on a first plurality of ports of a first network device, that a second plurality of ports comprise a logical channel from the perspective of a second network device, wherein the processor being operative to determine that the second plurality of ports comprise the logical channel from the perspective of the second network device comprises the processing unit being operative to:
   receive the data traffic on the first plurality of ports of the first network device from the second network device, wherein the processing unit being configured to receive the data traffic on the first plurality of ports of the first network device comprises the processing unit being configured to receive the data traffic on the first plurality of ports of the first network device in response to the first network device getting connected to the second network device and prior to the first network device being configured with the second network device,
   analyze the received data traffic prior to dropping the data traffic, wherein the first network device is operative to drop the data traffic prior to being configured with the second network device, and
   determine, based upon analyzing the data traffic, that the second plurality of ports comprise the logical channel; and
   configure, based upon determining that the second plurality of ports comprise the logical channel from the perspective of the second network device, the first plurality of ports as the logical channel on the first network device.

9. The apparatus of claim 8, wherein the data traffic is received on the first plurality of ports from an upstream network device comprising the second network device.

10. The apparatus of claim 8, wherein the processing unit being operative to analyze the data traffic received on the first plurality of ports of the first network device comprises the processing unit being operative to snoop on Link Aggregation Control Protocol (LACP) packets received on the first plurality of ports of the first network device.

11. The apparatus of claim 8, wherein the logical channel uses Link Aggregation Control Protocol (LACP).

12. The apparatus of claim 8, wherein the second network device comprises an existing distribution switch in a network.

13. The apparatus of claim 8, wherein the first network device comprises an un-configured access switch being added to a network.

14. The apparatus of claim 8, wherein the first plurality of ports of the first network device are physically connected with second plurality of ports of the second network device.

15. A non-transitory computer-readable medium that stores a set of instructions which when executed perform a method executed by the set of instructions comprising:
   determining, based upon analyzing data traffic received on a first plurality of ports of a first network device, that a second plurality of ports comprise a logical channel from the perspective of a second network device, wherein determining that the second plurality of ports comprise a logical channel from the perspective of the second network device comprises:
      receiving the data traffic on the first plurality of ports of the first network device from the second network device, wherein receiving the data traffic on the first plurality of ports of the first network device comprises receiving the data traffic on the first plurality of ports of the first network device in response to the first network device getting connected to the second network device and prior to the first network device being configured with the second network device,
      analyzing the received data traffic prior to dropping the data traffic, wherein the first network device is operative to drop the data traffic prior to being configured with the second network device, and
      determining, based upon analyzing the data traffic, that the second plurality of ports comprise the logical channel; and
   configuring, based upon determining that the second plurality of ports comprise the logical channel from the perspective of the second network device, the first plurality of ports as the logical channel on the first network device.

16. The non-transitory computer-readable medium of claim 15, wherein analyzing the data traffic received on the first plurality of ports of the first network device comprises analyzing the data traffic received on the first plurality of ports from an upstream network device comprising the second network device.

17. The non-transitory computer-readable medium of claim 15, wherein analyzing the data traffic received on the first plurality of ports of the first network device comprises snooping on Link Aggregation Control Protocol (LACP) packets received on the first plurality of ports of the first network device.

18. The non-transitory computer-readable medium of claim 15, wherein determining that the second plurality of ports comprise the logical channel comprises determining that the second plurality of ports comprise the logical channel wherein the logical channel uses Link Aggregation Control Protocol (LACP).

19. The non-transitory computer-readable medium of claim 15, wherein determining that the second plurality of ports comprise the logical channel from the perspective of the second network device comprises determining that the second plurality of ports comprise the logical channel from the perspective of the second network device wherein the second network device comprises an existing distribution switch in a network.

20. The non-transitory computer-readable medium of claim 15, wherein configuring the first plurality of ports as the logical channel on the first network device comprises configuring the first plurality of ports as the logical channel on the first network device wherein the first network device comprises an un-configured access switch being added to a network.

* * * * *